United States Patent
Fürst et al.

(10) Patent No.: US 7,644,055 B2
(45) Date of Patent: Jan. 5, 2010

(54) RULE-BASED DATABASE OBJECT MATCHING WITH COMPARISON CERTAINTY

(75) Inventors: Karl Fürst, Wiesloch (DE); Andrea Langlotz, Mannheim (DE); David Brookler, Los Angeles, CA (US); Dave Sullivan, Canoga Park, CA (US); Eugene Chemy, Sherman Oaks, CA (US)

(73) Assignee: SAP, AG, Walldorf (DE)

( * ) Notice: Subject to any disclaimer, the term of this patent is extended or adjusted under 35 U.S.C. 154(b) by 0 days.

(21) Appl. No.: 11/120,541

(22) Filed: May 2, 2005

(65) Prior Publication Data

US 2007/0005543 A1  Jan. 4, 2007

(51) Int. Cl.
*G06N 5/02* (2006.01)
*G06N 5/00* (2006.01)

(52) U.S. Cl. .............. 706/47; 706/45; 706/48
(58) Field of Classification Search ............ 706/45, 706/47, 48; 700/135
See application file for complete search history.

(56) References Cited

U.S. PATENT DOCUMENTS

| | | | | |
|---|---|---|---|---|
| 4,849,905 A * | 7/1989 | Loeb et al. | ............ | 706/48 |
| 6,137,911 A * | 10/2000 | Zhilyaev | ............ | 382/225 |
| 6,216,131 B1 * | 4/2001 | Liu et al. | ............ | 707/102 |
| 6,407,753 B1 * | 6/2002 | Budinsky et al. | ............ | 715/764 |
| 6,496,835 B2 * | 12/2002 | Liu et al. | ............ | 707/102 |
| 6,606,710 B2 * | 8/2003 | Krishnan et al. | ............ | 726/13 |
| 6,779,120 B1 * | 8/2004 | Valente et al. | ............ | 726/1 |
| 6,807,576 B1 * | 10/2004 | Jeffries et al. | ............ | 709/225 |
| 6,826,568 B2 * | 11/2004 | Bernstein et al. | ............ | 707/6 |
| 6,917,946 B2 * | 7/2005 | Corl et al. | ............ | 707/102 |
| 6,947,983 B2 * | 9/2005 | Corl et al. | ............ | 709/224 |
| 7,092,977 B2 * | 8/2006 | Leung et al. | ............ | 707/205 |
| 7,236,973 B2 * | 6/2007 | Kalthoff et al. | ............ | 707/6 |
| 7,346,675 B2 * | 3/2008 | Givoly et al. | ............ | 709/223 |
| 7,376,680 B1 * | 5/2008 | Kettler et al. | ............ | 707/205 |

OTHER PUBLICATIONS

Hernandez et al., Mauricio, "Real-world Data is Dirty: Data Cleansing and The Merge/Purge Problem", 1998.*

* cited by examiner

*Primary Examiner*—David R Vincent
*Assistant Examiner*—Adrian L Kennedy
(74) *Attorney, Agent, or Firm*—Dalina Law Group, P.C.

(57) ABSTRACT

Rule based data object matching to determine if two or more objects are similar to allow the objects to be merged into one master data object. The rules explicitly state what conditions are required to consider two or more objects equal. The certainty of the rule may be specified. Examples for the certainty are automatic, manual high, medium and low probability. For example, the certainty "automatic" specifies that the objects can be considered matches and no additional manual verification is needed. The certainty "manual low probability" specifies that there is a low probability that the objects are matches and that a manual verification is needed. Matching rules may be grouped by priority. If matches are not found, the next highest priority group of rules is processed. Hierarchical matching rules may be specified that are able to express similarity of objects considering structured objects containing sub-objects in a hierarchical manner.

2 Claims, 6 Drawing Sheets

US 7,644,055 B2

RULE-BASED DATABASE OBJECT MATCHING WITH COMPARISON CERTAINTY

BACKGROUND OF THE INVENTION

1. Field of the Invention

Embodiments of the invention described herein pertain to the field of computer software. More particularly, but not by way of limitation, one or more embodiments of the invention enable systems to apply a set of rules to determine if two or more data objects are similar in accordance with that the defined set of rules. Subsequent processes make use of the similarity information. Examples are the merging of similar objects to one resulting object and reporting using aggregated information.

2. Description of the Related Art

Modern businesses have a need to utilize stored business data to make effective business decisions. When the data in these systems is not shared and made consistent, inefficiencies occur. Achieving consistent data across multiple distributed heterogeneous systems is difficult. Establishing effective communication links between disparate systems is a prerequisite to making the data consistent, but does not alone solve the problem. Even when data is effectively shared throughout an organization, problems still arise in that over the course of time the data may exist in different forms and models. Since the achievement of data consistency is difficult it is common for companies to maintain data in independent realms. For example, because of the difficulties associated with merging data, some companies independently maintain data for each of their different corporate divisions and only utilize such data for business decisions relevant to a particular corporate division. The maintenance of independent systems often occurs during mergers and acquisitions where company systems are almost certainly heterogeneous and typically utilize radically different structures and data models.

To solve the data consistency problem and leverage the commonalities of data for the benefit of the company, companies typically seek to coordinate interaction between heterogeneous systems by identifying similar and overlapping data and then coordinating the integration of such data in a way that ensures the data stays consistent across different systems. Effectively accomplishing such coordination is difficult at best and tends to lead to organizational inefficiencies. One approach some organizations use is to maintain what is known as master data. Master data may be thought of as the definitive version of a data object. Solutions for coordinating the data, i.e., storing, augmenting and consolidating master data, are generally primitive and lack matching capabilities. Moreover, the fact that master data may exist does little to provide information technology personnel with insight about the process used in determining if an object matches another object.

Failing to successfully coordinate master data objects yields data object redundancies and inconsistencies that disrupt the business decision-making process and increase the overall cost of doing business. Furthermore, customer service suffers from incomplete data requiring customers to call multiple places within the same company to obtain the required information. In some cases the failure to efficiently service customers causes enough frustration that it begins to result in decreased customer loyalty and leads to a loss of customers.

Because of the limitations described above there is a need for a system and method that can effectively coordinate master data objects across an enterprise.

SUMMARY OF THE INVENTION

One or more embodiments of the invention enable systems to implement a rule-based approach to data object matching that enables the system to determine if two or more objects are similar. Once a set of two or more objects is determined to be similar, the system can merge the object set into one master data object or do any other further processing based on the matching result. The rules define what conditions are required to consider two or more objects as being similar or equal.

A certainty or confidence may be specified and then associated with each rule. Examples of the different indicators of certainty include, but are not limited to "automatic", "manual high probability", "manual medium probability", and "manual low probability". For example, the certainty "automatic" specifies that the objects can be considered matches and no additional manual verification is needed. The certainty "manual low probability" specifies that there is a low probability that the objects are truly matches and that a manual verification is needed.

Matching rules may be grouped by priority in such a way that if any matches are found in one priority group the matching process stops. If matches are not found, the next highest priority group of rules is processed.

Hierarchical matching rules may be specified that are able to express similarity of objects considering structured objects containing sub-objects in a hierarchical manner.

If no matching rule is defined a default rule may be applied. The ability to apply a default rule is particularly useful in embodiments of the invention that requires all fields of an object to be used for matching (e.g., two objects match if they are absolutely identical).

DETAILED DESCRIPTION OF THE INVENTION

A system and method for rule-based data object matching will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
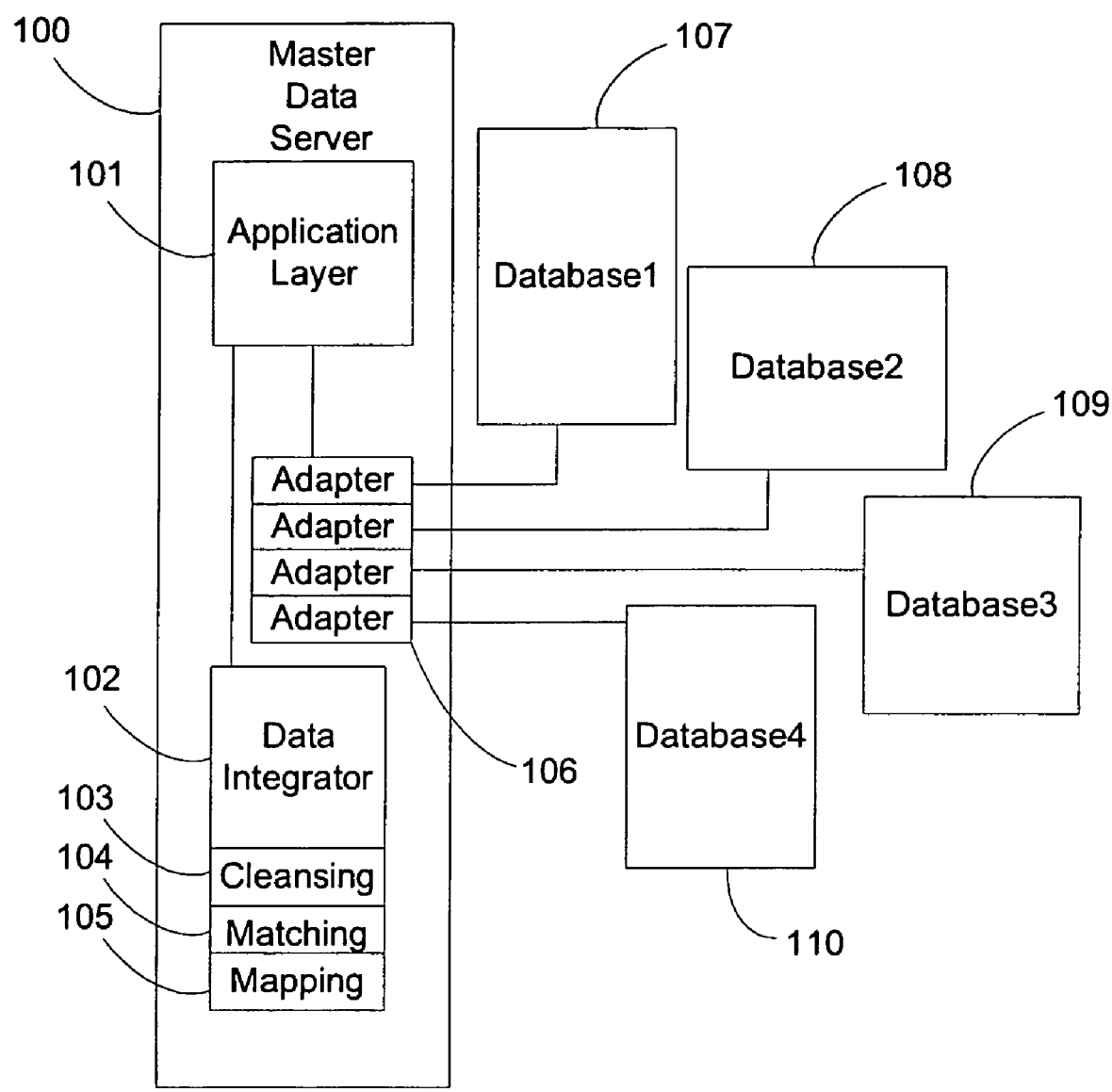
FIG. 1 illustrates an architectural view of a system utilizing an embodiment of the invention.

FIG. 1 illustrates an architectural view of a system utilizing an embodiment of the invention. Master Data Server 100 comprises an application layer 101 that interfaces with users authorized to view master data. The application layer makes use of adapters 106 that bridge the networks to the disparate databases 107, 108, 109 and 110. The adapters may make use of communications technologies such as robust message queuing to ensure that data is reliably transferred. Each adapter may be customized to interface to a specific system or database. Data integrator 102 is utilized by application layer 101 to integrate data from the disparate sources and is configured with cleansing 103, matching 104, and mapping 105 modules. Matching module 104 is configured to implement one or more embodiments of the invention. Modifications to data in database 108 for example may be extended to the other databases via mapping module 105 while cleansing module 103 may be utilized to perform initial cleansing or periodic cleansing of data to ensure the master data is appropriately harmonized. Regardless of the functions of the other modules, matching module 104 is charged with the task of performing matches on whatever data objects are presented to it.

Entry of rules is accomplished via an interface such as a text based interface or a graphical user interface that allows a user to point and click in order to create and modify rules graphically. Any interface that enables the entry of rules is in keeping with the spirit of the invention.

Figure 2:
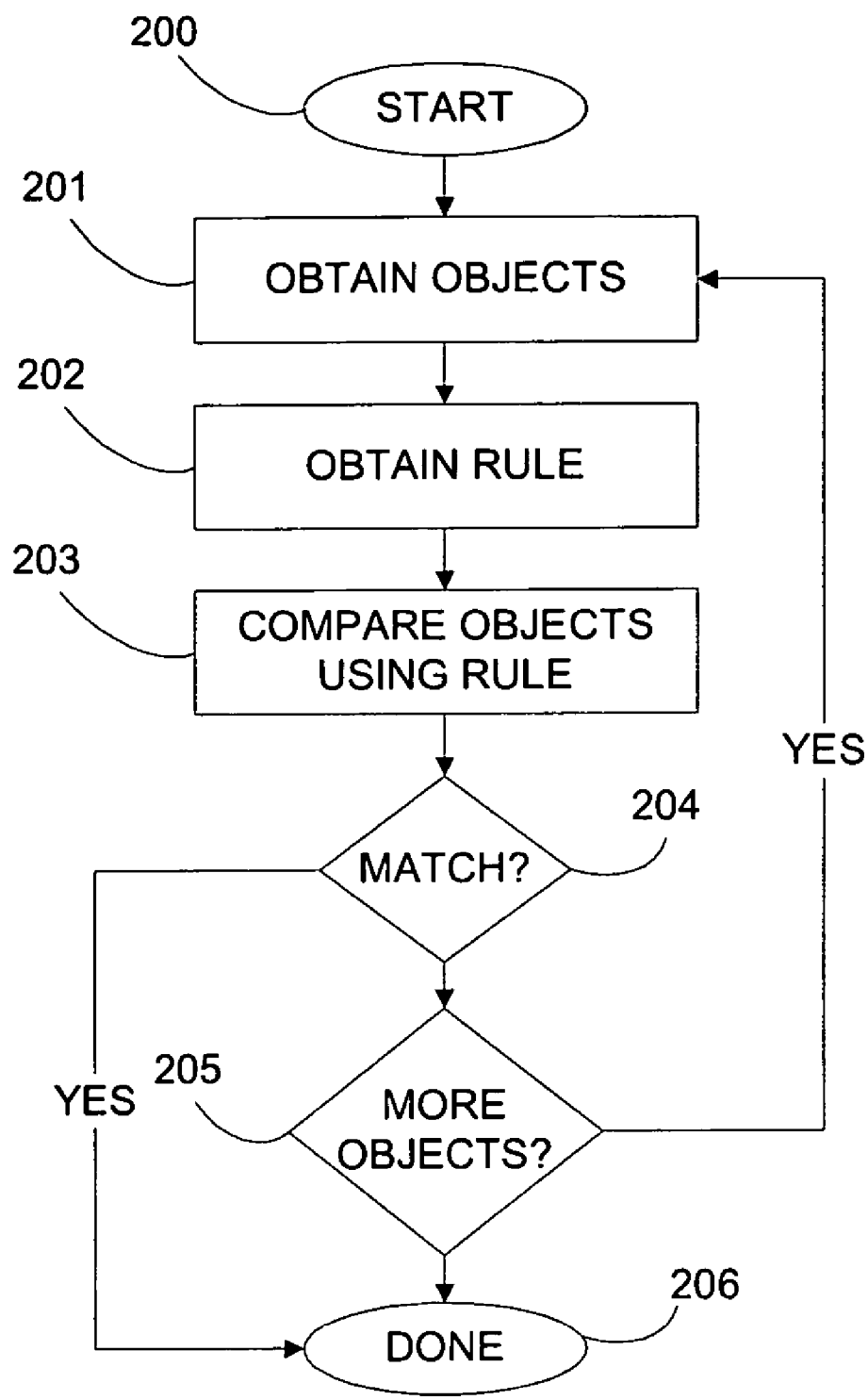
FIG. 2 illustrates a flow chart showing an embodiment of the invention comprising rule based matching.

FIG. 2 illustrates a flow chart of the rule based matching process as it occurs in accordance with one or more embodiments of the invention. Processing starts at step 200 by executing a rule or by data mining a set of target objects to match against at step 201. For instance, the system can obtain a group of active objects or instantiate a set of target objects for subsequent processing. A rule is obtained at step 202 and this rule may be a default rule that compares all fields of a source and target object if no user defined rule is specified. The rule is executed and thus the objects are compared at step 203. If there is a match, the flow of control passes to step 206. If there are more objects to compare as determined at step 205, then the process repeats at 201.

Figure 3:
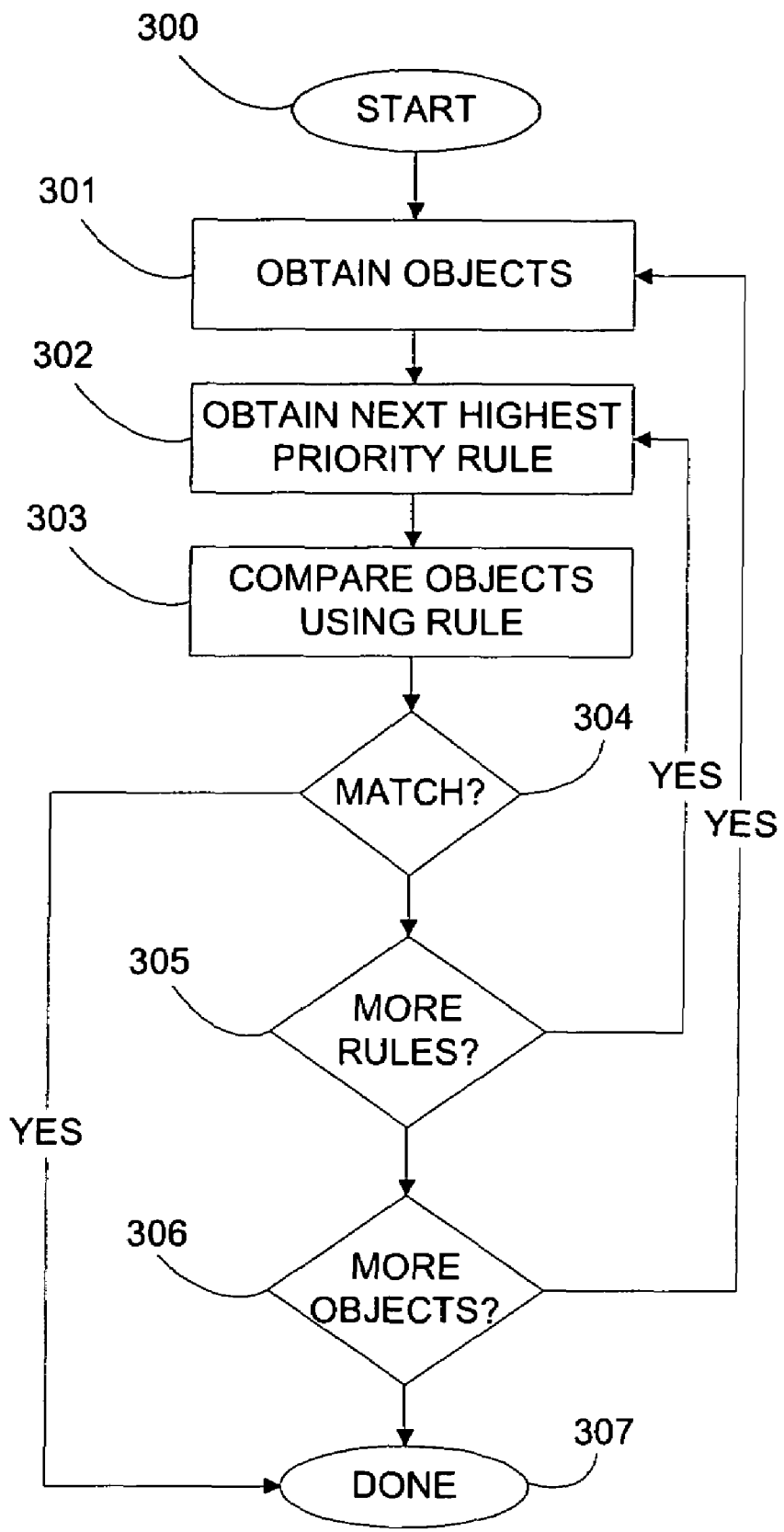
FIG. 3 illustrates a flow chart showing an embodiment of the invention comprising priority rule based matching.

FIG. 3 illustrates a flow chart of an approach to priority rule based matching. In this embodiment of the invention processing starts at 300 with objects obtained at step 301. The next highest priority rule is obtained at step 302 and this rule may be a default rule that compares all fields of a source and target object if no user defined rule is specified. The objects are compared at step 303 and if there is a match, the flow of control passes to step 307. If there are more rules to process as determined at step 305, then the flow of control passes to step 302. If there are more objects to compare as determined at step 306, then the process repeats at step 301. When there are no more objects to process, control passes to step 307 without producing a match.

Figure 4:
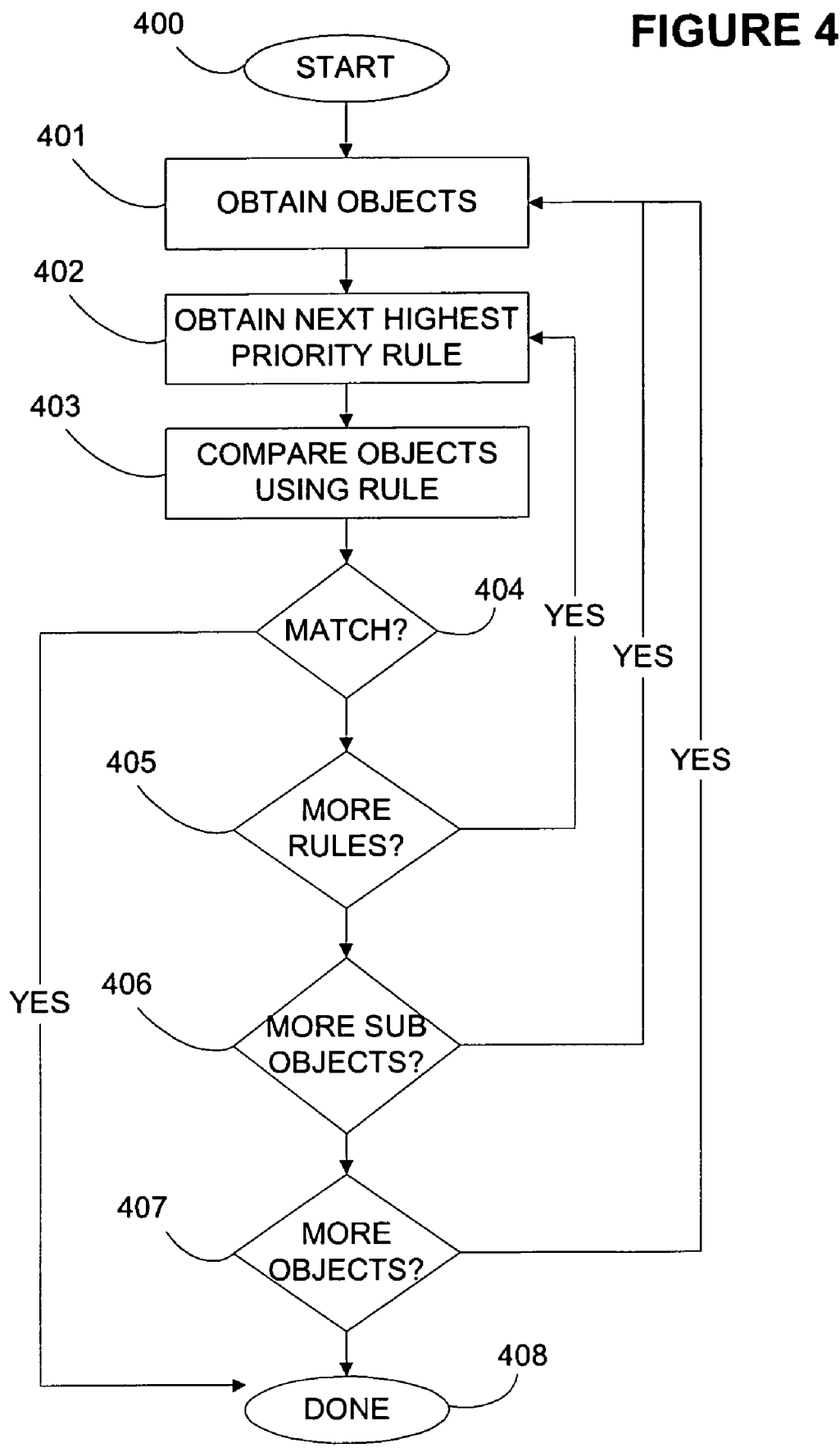
FIG. 4 illustrates a flow chart showing an embodiment of the invention comprising priority and hierarchical object rule based matching.

FIG. 4 illustrates a flow chart of an embodiment of the invention that utilizes a priority and hierarchical approach to perform rule based matching of objects. In this embodiment of the invention, processing starts at step 400 with objects obtained at step 401. Objects obtained at step 401 may comprise related objects such as sub objects of other objects in the repository, sub objects of other objects in the same process chain and/or sub objects of the current object itself. Hence when processing is applied against a set of objects it is also applied as needed to sub objects and/or related objects. The next highest priority rule is obtained at step 402 and this rule may be a default rule that compares all fields of a source and target object if no user defined rule is specified. The objects are compared at step 403 and if there is a match, the flow of control passes to done step 408. If there are more rules to process as determined at step 405, then the flow of control passes to step 402. If there are more sub objects to compare as determined at step 306, then sub objects are further traversed at step 401. For instance, if the parent objects match the sub object matching initiates. If there are more objects to compare as determined at step 407, then the process repeats at step 401. When there are no more objects to process, control passes to step 408 without producing a match.

Figure 5:
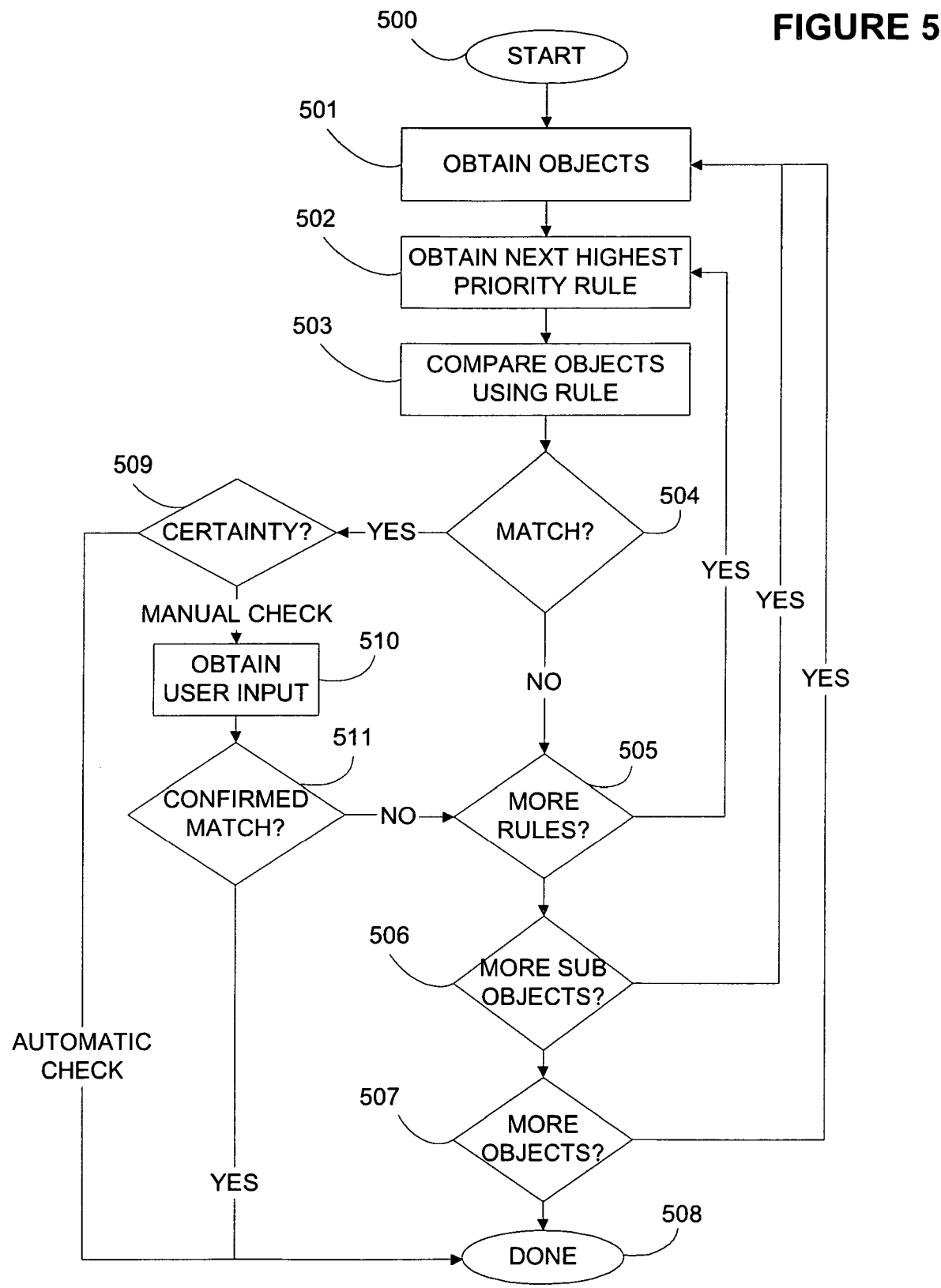
FIG. 5 illustrates a flow chart showing an embodiment of the invention comprising priority and hierarchical rule based matching with automatic and manual certainty testing.

FIG. 5 illustrates a flow chart of the invention that utilizes a priority and hierarchical rule based approach to matching with automatic and manual certainty testing. In this embodiment of the invention, processing starts at step 500 with objects obtained at step 501. Objects obtained at step 501 may comprise related objects such as all sub objects of other objects in the repository, all sub objects of other objects in the same process chain or all sub objects of the current object itself. The next highest priority rule is obtained at step 502 and this rule may be a default rule that compares all fields of a source and target object if no user defined rule is specified. The objects are compared at step 503 and if there is a match, the flow of control passes to the certainty test at step 509. If the certainty value of the match is automatic then control flows to done step 508. If the certainty value of the match is manual, then the user is queried to determine if the match is valid or not at step 510. If the user confirms a valid match at step 511, then flow of control passes to step 508. If the user determines that there is a false match at step 511, then flow of control passes to step 505 in order to check for more rules. If there are more rules to process as determined at step 505, then the flow of control passes to step 502. If there are more sub objects to compare as determined at step 506, then sub objects are further traversed at step 501. If there are more objects to compare as determined at step 507, then the process repeats at step 501. When there are no more objects to process, control passes to step 508 without producing a match.

Figure 6:
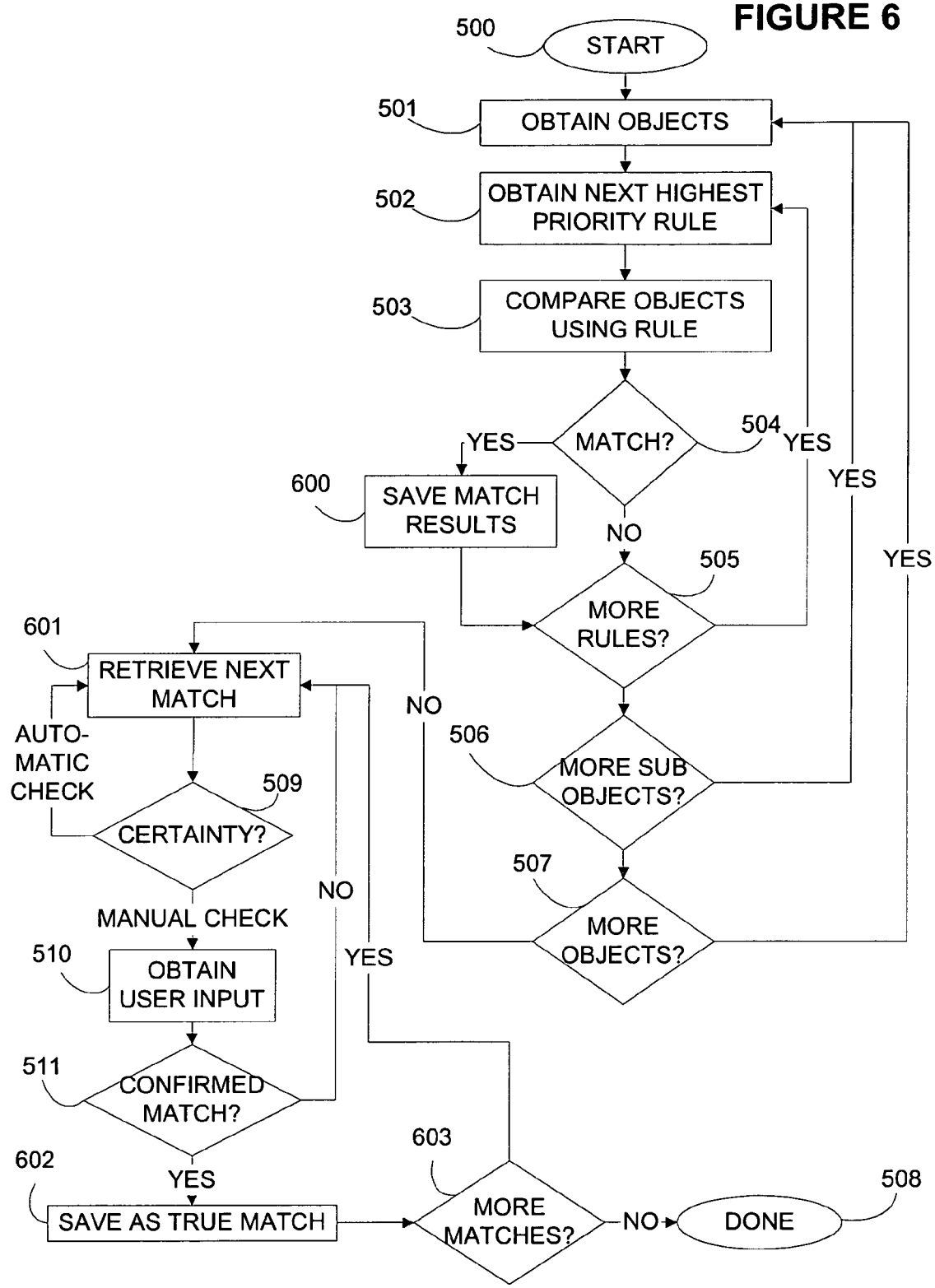
FIG. 6 illustrates a flow chart showing an embodiment of the invention comprising priority and hierarchical rule based matching with automatic certainty testing followed by a manual certainty testing phase.

FIG. 6 illustrates a flow chart of the invention that utilizes a priority and hierarchical rule based approach to matching with automatic and manual certainty testing. In contrast to the embodiment illustrated in FIG. 5, the manual certainty testing is performed subsequent to the automatic certainty testing. In this example the user decision is not part of the matching but part of the subsequent processing of the matching result which is independent of the matching itself. Objects obtained at step 501 may comprise related objects such as all sub objects of other objects in the repository, all sub objects of other objects in the same process chain or all sub objects of the current object itself. The next highest priority rule is obtained at step 502 and this rule may be a default rule that compares all fields of a source and target object if no user defined rule is specified. The objects are compared at step 503 and if there is a match, then the match result is saved at 600 for subsequent manual processing. If there is no match at 503, then processing continues for all rules at 505. If there are more rules to process as determined at step 505, then the flow of control passes to step 502. If there are more sub objects to compare as determined at step 506, then sub objects are further traversed at step 501. If there are more objects to compare as determined at step 507, then the process repeats at step 501. When there are no more objects to process, control passes to step 601 where saved matches are retrieved (if there are no matches then processing completes and this is not shown as an output from 601 for ease of illustration). If the certainty of the match is set to automatic, then the next match is retrieved at 601. If the certainty value of the match is manual, then the user is queried to determine if the match is valid or not at step 510. If the user confirms a valid match at step 511, then the match is saved as a true match at 603 to determine if there are more saved matches to check. If there are more matches to check control passes to 601 where the next saved match is retrieved. If there are no more matches to process then the process ends at 508.

A graphical user interface may be utilized to input the rules and a parser may provide a mechanism for validating the syntax of the rules. Text based or any other type of interface may also be used in order to allow a user to enter rules.

The operators for use in the rule based matching are described in the following tables:

Source-field Modification Operators:

These operators are applied to the source-field.

| Operator | Description |
| --- | --- |
| LEFT(field, n) | Extract the left n characters from field |
| RIGHT(field, n) | Extract the right n characters from field |
| SUBSTRING(field, start-pos, n) | Extract n characters from field starting with start-pos |
| ADD_PREFIX(field, string) | Adds a prefix-string to the source field |
| ADD_SUFFIX(field, string) | Adds a suffix-string to the source field |

Operators for Comparing Source and Target:

These operators generally comprise three parameters, the two values and a fuzziness parameter. The fuzziness parameter is optional and if not specified yields a rule with no fuzziness utilized in a match using the rule. The default value for fuzziness is 0 which means that no fuzziness is specified by the rule. The fuzzy evaluation may consider sounds-like, transposition of letters, doubling of a letter, adjacent-on-keyboard or any other algorithm for specifying near matches to signify true matches.

If the operators only comprise one field, or one field and an optional fuzziness value, then both target and source fields have the same name.

If the target-value exists normalized, the source-value is automatically normalized before any of the comparing operators is called. The normalized target-value is used for comparison.

| Operator | Description |
| --- | --- |
| EQUAL(field-source, field-target, fuzziness, compare) | (modified) source and target are equal and both are not null |
| COMPARE (fuzziness) | comparison operation (e.g., distance, sounds like, adjacent on keyboard, etc ...) |
| CONTAINS(field-source, field-target, fuzziness, compare) | (modified) source is contained in target and both are not null |
| STARTS_WITH(field-source, field-target, fuzziness, compare) | target starts with (modified) source and both are not null |
| ENDS_WITH(field-source, field-target, fuzziness, compare) | target ends with (modified) source and both are not null |
| NULL(field, source/target) | field of source or target is null |
| NORMALIZE(field-source, field-target) | normalize a source and/or target field if either is specified, (for example for a text field make all characters upper case). |

The examples shown below contain often one field value only. If this is the case, the field name of source and target are the same.

Logical Operators.

The following logical operators can be used to build up complex rules

| Operator | Description |
| --- | --- |
| exp1 AND exp2 | Logical AND of expression1 and expression2 |
| exp1 OR exp2 | Logical OR of expression1 and expression2 |
| NOT(exp) | Logical NOT of expression |

Sub-objects (e.g. addresses or material segments) related objects (e.g. a vendor of a product) are addressed using the OBJECT operator.

For matching it is assumed that one (sub) object at a time is compared to either all sub objects of other objects in the repository, all sub objects of other objects in the same process chain or all sub objects of the current object itself.

If no matching rules for sub objects are defined the sub objects should not be used for determining matching results.

The following parameters are used in matching sub objects specified within the OBJECT-BEGIN and OBJECT-END operator pair, for example:

OBJECT-BEGIN(FIELD, SELECTION, ANY/ALL)
OBJECT-END

| Parameter | Description |
| --- | --- |
| SELECTION | Selects a subset of the fields relevant for matching e.g. for a plant dependent sub object the selection plant = 1000 |
| ANY | If any (one or more) sub objects of the current object matches the sub objects of the other object the sub objects match. |
| ALL | If all sub objects of the current object match the sub objects of the other object the sub objects match |

The following examples show various combinations of operators for performing various matches.

Example 1 shows three rules that may be performed in the order shown thereby providing a priority for the rules. The example shows an automatic certainty rule that will result in a positive match if both the target and source objects have the same values for DUNS (Data Universal Numbering System) and TAX (e.g., tax identification number) respectively. In the next highest priority rule, a high certainty manual rule that allows a user to verify that a match exists for a source or target object that has a NULL value for TAX if both the source and target objects have the same DUNS value. Finally, the next highest priority rule specifies the converse test with respect to the last described rule, i.e., if both source and target objects have the same value for TAX and either one has a NULL value for DUNS then the object is probably the same and is left for the user to decide manually.

EXAMPLE 1

AUTO: EQUAL(DUNS) AND EQUAL(TAX)
MANUAL(high): EQUAL(DUNS) AND (NULL(TAX, source) OR NULL(TAX, target))
MANUAL(high): EQUAL(TAX) AND (NULL(DUNS, source) OR NULL(DUNS, target))

Example 2 shows two rules with some data manipulation commands. First, the PARTNUMBER is normalized in both the source and the target. In one or more embodiments of the invention the command as specified may operate on only the source unless a comma is placed before the field name meaning that the source field would not be normalized while the target value would be normalized. Next the leftmost 20 characters of the PARTNUMBER are extracted, then an automatic certainty rule is specified requiring both source and target to contain the PARTNUMBER. The next rule begins with a command to extract the rightmost 18 characters from the PARTNUMBER, the field of which is already normalized as per the first command in the rule group. A manual certainty rule is then specified if the 18 rightmost PARTNUMBER characters match the target field PARTNUMBER.

EXAMPLE 2

MODIFY: NORMALIZE(PARTNUMBER)
MODIFY: LEFT(PARTNUMBER, 20)
AUTO: CONTAINS(PARTNUMBER)
MODIFY: RIGHT(PARTNUMBER, 18)
MANUAL(medium): CONTAINS(PARTNUMBER)

Example 3 shows two rules. First an automatic certainty rule is specified if both source and target object have equal DUNS values AND the specified sub objects related to ADDRESS in the source or target match their normalized POSTAL_CODE and CITY and STREET and NUMBER. In addition, a manual high certainty rule follows that specifies that sub objects related to the ADDRESS, namely POSTAL CODE and CITY and STREET must be equal for the user to manually confirm that the objects are indeed a match.

EXAMPLE 3

AUTO: EQUAL(DUNS) AND
OBJECT-BEGIN(ADDRESS, *, ANY)
NORMALIZE(POSTAL_CODE)
EQUAL(POSTAL_CODE) AND EQUAL(CITY) AND EQUAL(STREET) AND EQUAL(NUMBER).
OBJECT-END(ADDRESS).
MANUAL(high): OBJECT-BEGIN(ADDRESS, *, ANY).
(EQUAL(POSTAL_CODE) OR EQUAL(CITY)) AND EQUAL(STREET)
OBJECT-END(ADDRESS)

Example 4 shows a variation of the above rule where a SELECTION has been made for a plant number (PLANTNR) equal to 100. I.e., for a plant dependent sub object, the selection plant=100 specifies what sub objects should be used in the match.

EXAMPLE 4

AUTO: EQUAL(GTIN).
OBJECT-BEGIN(PLANTDATA, PLANTNR=100, ALL)
AUTO: EQUAL . . .
OBJECT-END

Example 5 shows a manual medium certainty rule wherein the PARTNUMBER of the source being equal to the GTIN of the target satisfies the rule, OR the PARTNUMBER of the source and the UPC of the target satisfies the rule, OR both the source and target PARTNUMBERS are equal.

EXAMPLE 5

MANUAL(medium): EQUAL(source=PARTNUMBER, target=GTIN) OR EQUAL(source=PARTNUMBER, target=UPC) OR EQUAL(source=PARTNUMBER, target=PARTNUMBER)

Example 6 shows a manual high certainty rule that is satisfied when the DESCRIPTION field of the source CONTAINS the GTIN field of the target.

EXAMPLE 6

MANUAL(high): CONTAINS(source=DESCRIPTION, target=GTIN).

U.S. patent application Ser. No. 09/577,268 entitled "Timeshared Electronic Catalog System And Method" filed May 23, 2000, U.S. Pat. No. 6,754,666 entitled "Efficient Storage And Access In A Database Management System" filed Aug. 21, 2000, U.S. patent application Ser. No. 09/643,316 entitled "Data Indexing Using Bit Vectors" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 10/022,056 entitled "Method And Apparatus For Transforming Data" filed Dec. 12, 2001, U.S. patent application Ser. No. 09/960,541 entitled "Method And Apparatus For Dynamically Formatting And Displaying Tabular Data In Real Time" filed Sep. 20, 2001, U.S. patent application Ser. No. 10/172,572 entitled "Method And Apparatus For Generating And Utilizing Qualifiers And Qualified Taxonomy Tables" filed Jun. 13, 2002, U.S. patent application Ser. No. 10/990,293, entitled "Accelerated System And Methods For Synchronizing, Managing, And Publishing Business Information" filed Nov. 15, 2004, U.S. patent application Ser. No. 10/990,292 entitled "System And Method For Dynamically Constructing Synchronized Business Information User Interfaces" filed Nov. 15, 2004, U.S. patent application Ser. No. 10/990,294 entitled "System And Method For Dynamically Modifying Synchronized Business Information Server Interfaces" filed Nov. 15, 2004, are all hereby incorporated herein by reference.

While the invention herein disclosed has been described by means of specific embodiments and applications thereof, numerous modifications and variations could be made thereto by those skilled in the art without departing from the scope of the invention set forth in the claims.

What is claimed is:

1. A computer program product for rule-based data object matching comprising:
    a computer usable memory medium having computer readable program code embodied therein wherein said computer readable program code comprises a matching module that is configured to:
    obtain a source database record and a target database record;
    obtain an object matching rule;
    compare a first data value held within a field in said source database record to a second data value held within said field in said target database record utilizing said object matching rule wherein said object matching rule comprises a fuzziness evaluation based on an evaluation selected from the group consisting of a sounds-like evaluation, a transposition of letters evaluation, a doubling of a letter evaluation and an adjacent-on-keyboard evaluation of said first data value and said second data value;

determine whether said compare of said first data value held within said field in said source database field to said second data value held within said field in said target database field has resulted in a match in order to determine when done;

check for more target database records to compare;

said obtain said object matching rule further configured to obtain a next highest priority rule from a prioritized list of rules;

check for more rules in said prioritized list of rules;

check for more sub objects associated with said source database record and said target database record to compare;

determine a certainty setting for a comparison result derived from said compare;

obtain user input with respect to said comparison result when said certainty setting is set to manual verification;

confirm said comparison result; and, merge said source database record and said target database record into a master data object when confirmation obtained from said confirm said comparison indicates an actual match, whereby said merge produces said master data object.

2. The computer program product of claim 1 wherein said computer readable program code is further configured to:

display a graphical user interface configured for said obtain said object matching rule; and, display said graphical user interface configured for said obtain said user input with respect to said comparison result.

* * * * *

UNITED STATES PATENT AND TRADEMARK OFFICE
CERTIFICATE OF CORRECTION

PATENT NO. : 7,644,055 B2  Page 1 of 1
APPLICATION NO. : 11/120541
DATED : January 5, 2010
INVENTOR(S) : Furst et al.

It is certified that error appears in the above-identified patent and that said Letters Patent is hereby corrected as shown below:

On the Title Page
The Item (75) Inventors: "Eugene Chemy, Sherman Oaks, CA (US)" should read
--Eugene Cherny, Sherman Oaks, CA (US)--

Signed and Sealed this

Ninth Day of March, 2010

David J. Kappos
*Director of the United States Patent and Trademark Office*